(12) United States Patent
Fratello et al.

(10) Patent No.: US 6,735,884 B2
(45) Date of Patent: May 18, 2004

(54) BLOWER DRYER FOR AUTOMATIC VEHICLE WASH SYSTEMS AND METHOD OF USING SAME

(75) Inventors: Daniel Fratello, Golden, CO (US); Dennis R. McCadden, Wheat Ridge, CO (US); Thanh Tran, Aurora, CO (US)

(73) Assignee: Mark VII Equipment, Inc., Arvada, CO (US)

( * ) Notice: Subject to any disclaimer, the term of this patent is extended or adjusted under 35 U.S.C. 154(b) by 0 days.

(21) Appl. No.: 10/177,034

(22) Filed: Jun. 20, 2002

(65) Prior Publication Data

US 2003/0233767 A1 Dec. 25, 2003

(51) Int. Cl.$^7$ .................................................. F26B 3/00
(52) U.S. Cl. ............................. 34/487; 34/666; 34/218; 34/229; 34/232; 239/751; 454/305
(58) Field of Search .......................... 34/487, 666, 524, 34/229, 230, 232, 233, 235, 218, 219, 224, 225; 239/750, 751, 752, 753; 454/76, 305

(56) References Cited

U.S. PATENT DOCUMENTS

| | | | | |
|---|---|---|---|---|
| 4,683,668 A | * | 8/1987 | Hondzinski et al. | ......... 34/229 |
| 4,730,401 A | * | 3/1988 | Machin | ......... 34/43 |
| RE33,334 E | * | 9/1990 | Nelson | ......... 15/302 |
| 5,367,739 A | * | 11/1994 | Johnson | ......... 15/316.1 |
| 5,960,564 A | * | 10/1999 | McElroy et al. | ......... 34/666 |
| 6,282,746 B1 | * | 9/2001 | Schleeter | ......... 15/302 |
| 6,530,115 B2 | | 3/2003 | MacNeil | |
| 2002/0162576 A1 | * | 11/2002 | Fratello et al. | ......... 134/18 |

* cited by examiner

Primary Examiner—Henry Bennett
Assistant Examiner—Camtu Nguyen
(74) Attorney, Agent, or Firm—Dorsey & Whitney LLP (57) ABSTRACT

A dryer system for automated car wash systems includes a new and improved air dryer having a fan and a rotatable nozzle at its discharge end with the nozzle orientation being controlled by a rotary actuator whose drive shaft is mounted on the axis of rotation of the nozzle. A method of using the blowers includes the use of two or more blowers that are positioned above the vehicle and oriented so the streams of concentrated air complement each other in moving liquid particles on the vehicle toward the side or end of the vehicle where they drop from the lower edges of the sides and ends of the vehicle.

7 Claims, 11 Drawing Sheets

BLOWER DRYER FOR AUTOMATIC VEHICLE WASH SYSTEMS AND METHOD OF USING SAME

BACKGROUND OF THE INVENTION

1. Field of the Invention

The present invention relates generally to automated vehicle wash systems, and more specifically to a new and improved blower for drying such vehicles and to a method of using the blower.

2. Description of the Relevant Art

Automated apparatus for washing automotive vehicles have become popular as a way of quickly and efficiently washing a vehicle. The systems have assumed numerous configurations including tunnel-type washes wherein a plurality of wash apparatus are longitudinally aligned for sequential washing of a vehicle that is moved therealong. Another common form of automatic system is a gantry-type system wherein the vehicle remains stationary and the wash apparatus is reciprocated back and forth across the vehicle. In a gantry-type wash system, different wash operations are performed in each pass of the apparatus along the length of the vehicle.

In any automated wash system, however, it is desirable to dry the vehicle after it has been washed and rinsed. The conventional systems for drying vehicles is an air blower. Such blowers have assumed numerous configurations with the most common blowers being fixed relative to the vehicle to direct air horizontally at the sides of the vehicle and downwardly onto the top of the vehicle. As with the washing of the vehicle, the vehicles are moveable relative to the blowers so the drying occurs as the vehicle is relatively moved past the blower.

Most blow dryers for automotive vehicles are inefficient and therefore unsatisfactory in that the air being blown onto the vehicle is counterproductive as air from one blower is directed in an opposite direction to air from another blower and the liquid particles on the vehicle are not moved off the surface of the vehicle.

More recently, rotary blow-drying nozzles have been mounted on fans above a vehicle so that concentrated fan-shaped streams of air are blown on the vehicle either in a direction perpendicular to the surface of the vehicle or in a reciprocating pattern. With these blow dryers, there is again no conscience attempt to move the liquid particles off the surface of the vehicle but rather the air is simply randomly blown at the vehicle resulting in an inefficient drying of the vehicle.

In a rotary blow dryer of the type described above, there is typically a large fan having a housing with an inlet and an outlet. The rotary nozzle is rotatably mounted on the fan housing at the outlet from the housing and rotated about a vertical axis with a drive actuator mounted externally of the nozzle and fan housing. In one such arrangement, the actuator is connected to the nozzle with a belt that extends around the nozzle such that operation of the actuator rotates the nozzle through the interconnection with the belt. Such arrangements are relatively expensive and aesthetically displeasing.

As will be appreciated, there is a need for an improved blow dryer for automotive car wash systems and also for an efficient system for using the blow dryers to remove liquid particles from the vehicle to obtain the desired drying of the vehicle.

BRIEF SUMMARY OF THE INVENTION

The blow dryer of the present invention is used in a blow-drying system that uses a plurality of the blow dryers mounted above an automotive vehicle. Each blow dryer includes a fan housing with an inlet and an outlet and a rotatable nozzle mounted on the fan housing at the outlet. The rotatable nozzle includes an opening through which air can be concentrated in a fan-shaped stream and directed toward the vehicle at a selected angle.

The drive shaft of a rotary actuator is mounted in the blow dryer along the axis of rotation of the nozzle and interiorly thereof so as to be concealed from view and to efficiently and economically provide a system for selectively rotating the nozzle. The rotary actuator is equipped with adjustable stop means for limiting the movement of the actuator in reverse directions so the associated nozzle can be selectively rotated into any desired angle relative to the underlying vehicle.

In accordance with the method of drying an automotive vehicle using the blower of the present invention, the nozzles of a plurality of blowers are oriented relative to the vehicle such that the conical streams of air emanating therefrom are complementary in moving the liquid particles on the vehicle toward a common side or end of the vehicle. In one embodiment of the invention, a pair of blowers are mounted above the vehicle on opposite sides of a longitudinal centerline of the vehicle with one blower forming a relatively large angle relative to the longitudinal centerline of the vehicle and the other a relatively small angle. As the blowers are moved relative to the vehicle from one end of the vehicle to the other liquid particles are blown toward one side and one end of the vehicle. When the direction of the blowers are reversed relative to the vehicle, the angles of the blowers are reversed so that liquid particles on the vehicle are moved toward the other side of the vehicle and the opposite end of the vehicle. The result of such an operation is a vehicle surface that is substantially devoid of liquid particles.

In another embodiment of the invention, three blowers are provided above the vehicle with a center blower being aligned with the longitudinal centerline of the vehicle and two side blowers in substantial vertical alignment with the sides of the vehicle. The center blower directs a conical stream of air at a 0° angle relative to the longitudinal centerline of the vehicle while the side blowers direct conical streams of air at an angle toward the center of the vehicle so the three blowers cooperate in moving the liquid particles on the vehicle toward one end of the vehicle while simultaneously blowing liquid particles on the sides of the vehicle downwardly toward the supporting surface of the vehicle.

Other aspects, features and details of the present invention can be more completely understood by reference to the following detailed description of the preferred embodiments, taken in conjunction with the drawings and from the appended claims.

DETAILED DESCRIPTION OF THE INVENTION

Figure 1:
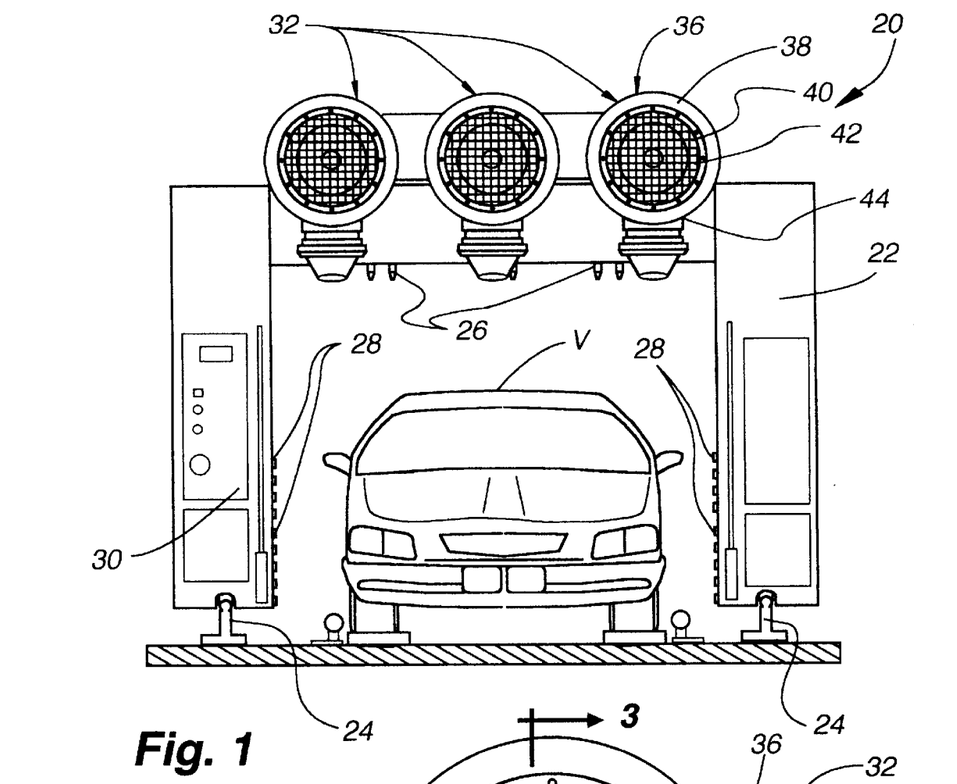
FIG. 1 is a front elevation of a car wash apparatus of the gantry type having a vehicle positioned thereunder and a set of three blowers in accordance with the present invention mounted thereabove.
Figure 2:
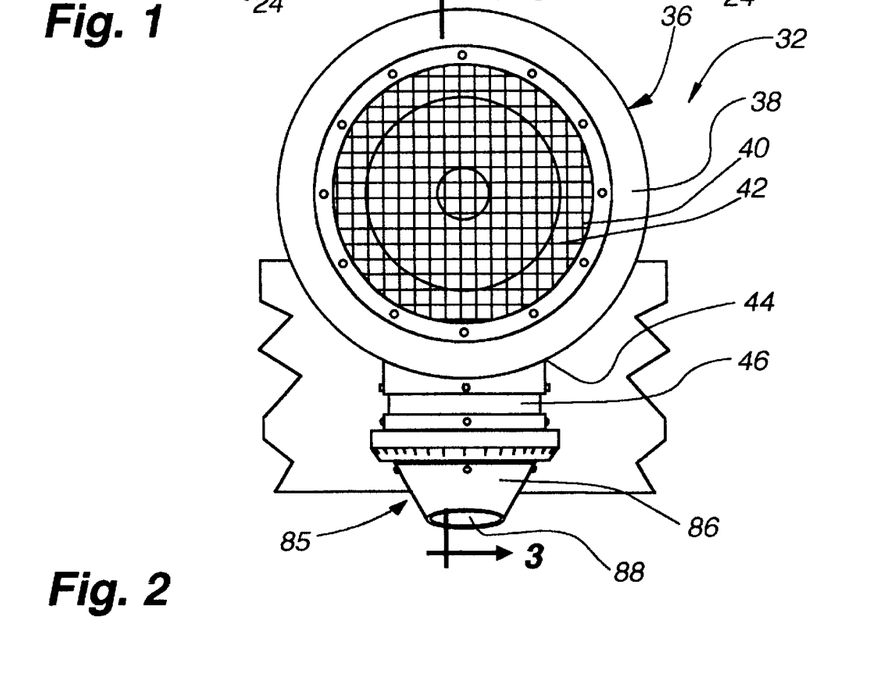
FIG. 2 is an enlarged fragmentary front elevation of one of the blowers shown in FIG. 1.
Figure 3:
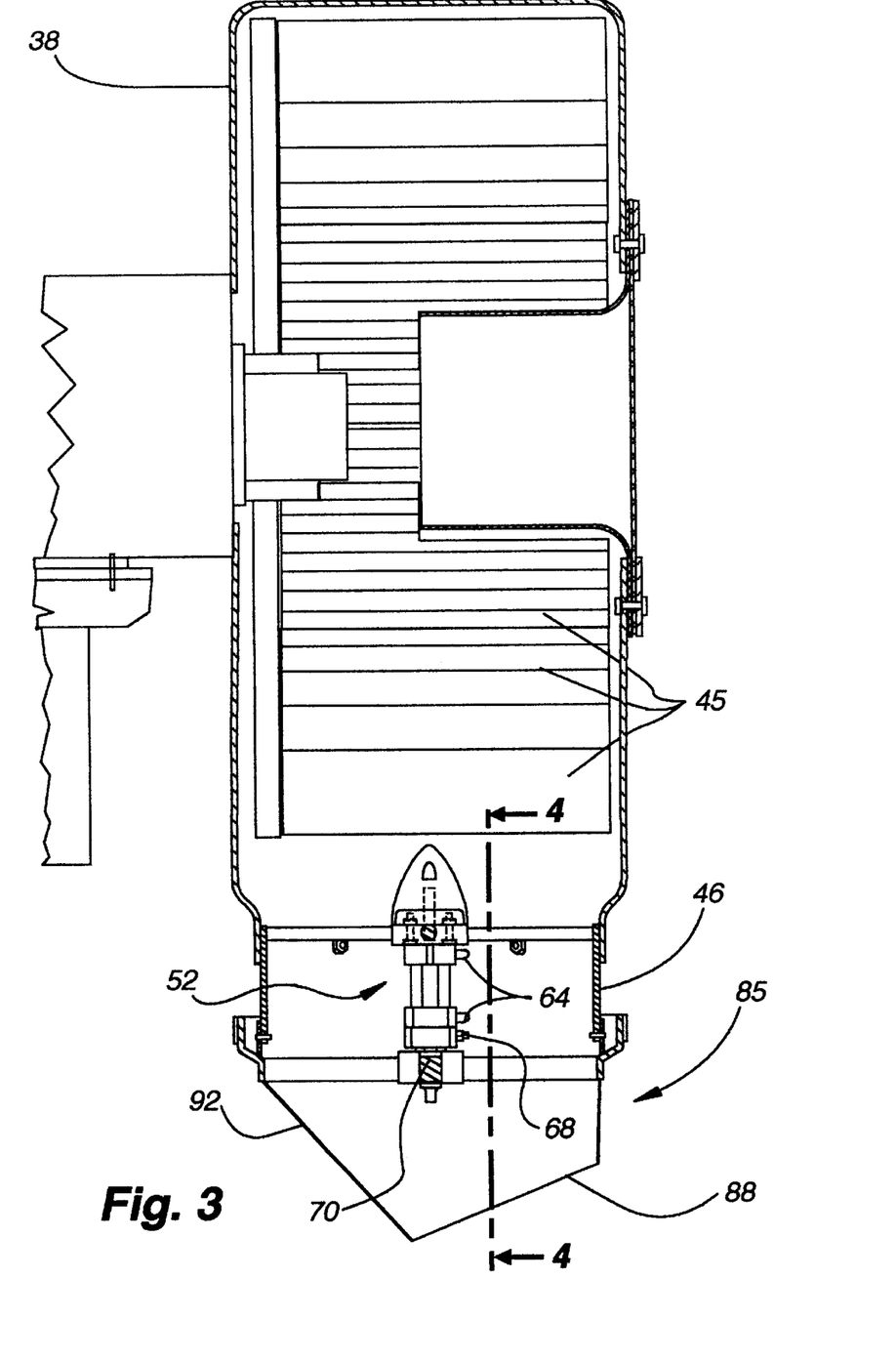
FIG. 3 is an enlarged fragmentary section taken along line 3—3 of FIG. 2.
Figure 4:
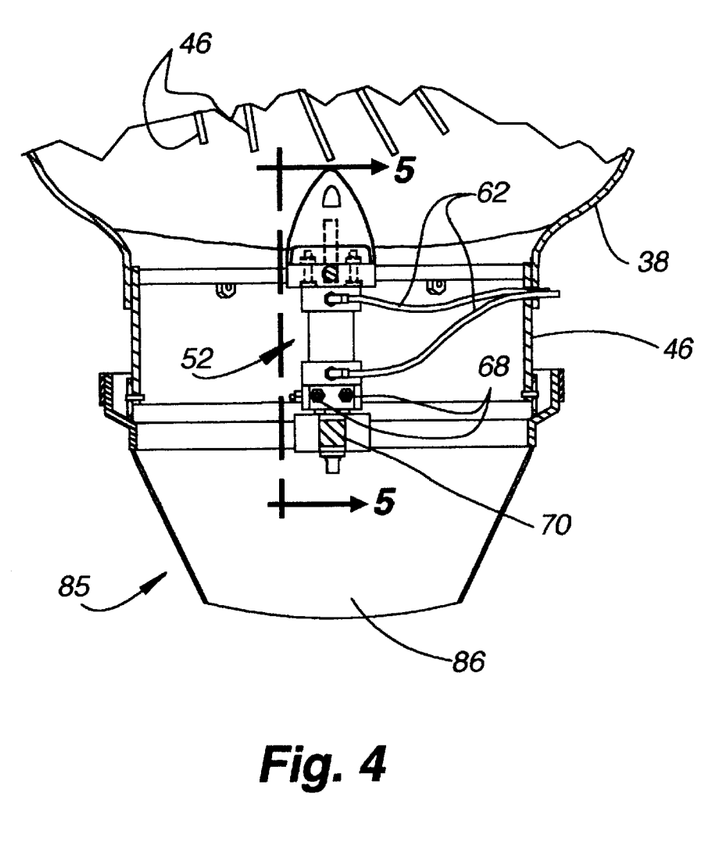
FIG. 4 is an enlarged fragmentary section taken along line 4—4 of FIG. 3.
Figure 5:
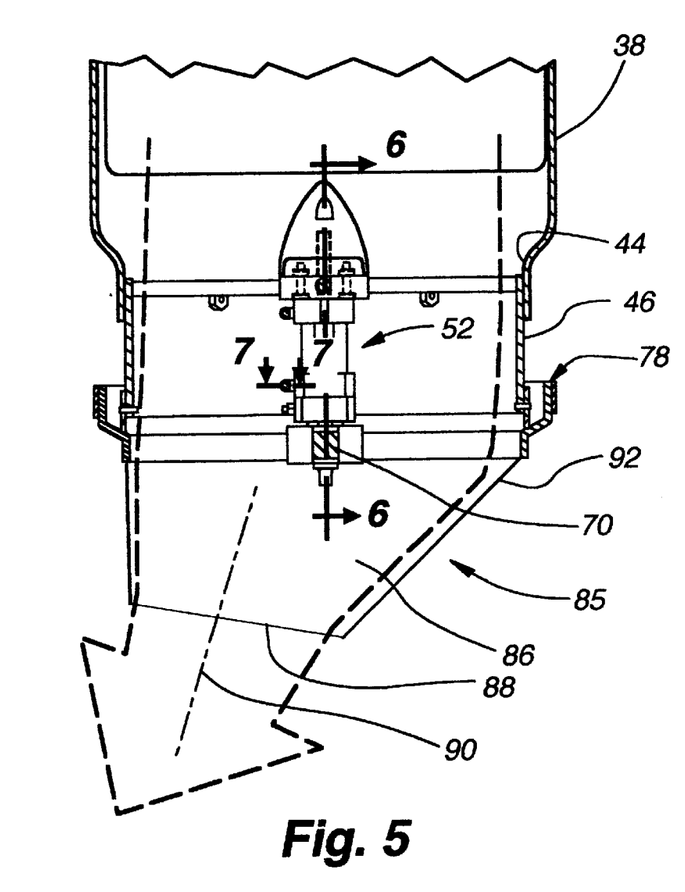
FIG. 5 is a fragmentary section taken along line 5—5 of FIG. 4.

A car wash apparatus 20 is shown in FIG. 1 of the gantry type including an inverted U-shaped frame 22 conventionally used in reciprocating car wash systems. The frame is mounted on elongated tracks 24 for linear reciprocating movement over and along the length of a vehicle V positioned therebeneath. The apparatus includes overhead spray nozzles 26 as well as side spray nozzles 28 conventionally used in automatically washing a vehicle. A control system 30 is incorporated into the frame for controlling its operation as is typical in gantry-type car wash systems. As the gantry moves back and forth along the length of a vehicle, various washing operations conventionally occur such as applying a presoak solution, rinsing the presoak solution from the vehicle, applying a drying agent, applying a wax finish and the like.

The apparatus 20 shown in FIG. 1 further includes three identical overhead air dryers 32 in accordance with the present invention with one of the air dryers being mounted on the gantry in vertical alignment with a longitudinal centerline 34 (FIGS. 8, 10, 11 and 13) of the vehicle, a second dryer being vertically aligned with one side of the vehicle and the third dryer being vertically aligned with the opposite side of the vehicle. The operation of the air dryers in accordance with the method of the present invention will be set forth later.

With specific reference to FIGS. 2–7, the air dryers 32 which are identical in construction can be seen to include a fan 36 enclosed within a fan housing 38 of a conventional type wherein the fan has a large inlet opening 40 with a screen 42 thereacross and an outlet opening 44 through which a concentrated stream of air is emitted. The fan, as is conventional, includes a plurality of circumferentially spaced blades 45 which are shaped and oriented to draw air through the inlet 40 of the housing and emit the air in a concentrated stream under pressure through the outlet 44 of the housing.

Figures 6, 7:
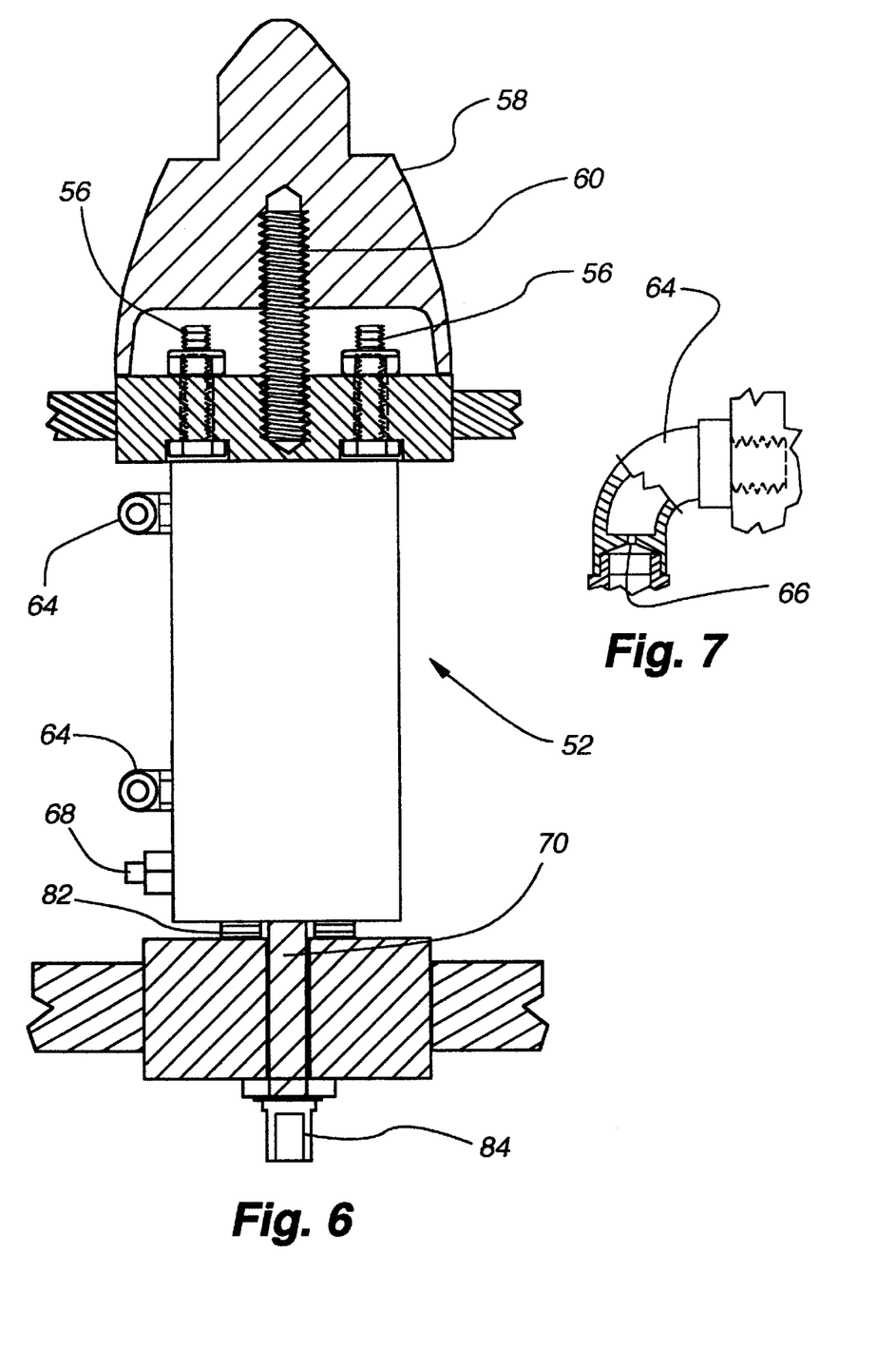
FIG. 6 is an enlarged fragmentary section taken along line 6—6 of FIG. 5.
FIG. 7 is an enlarged fragmentary section taken along line 7—7 of FIG. 5.
Figure 14:
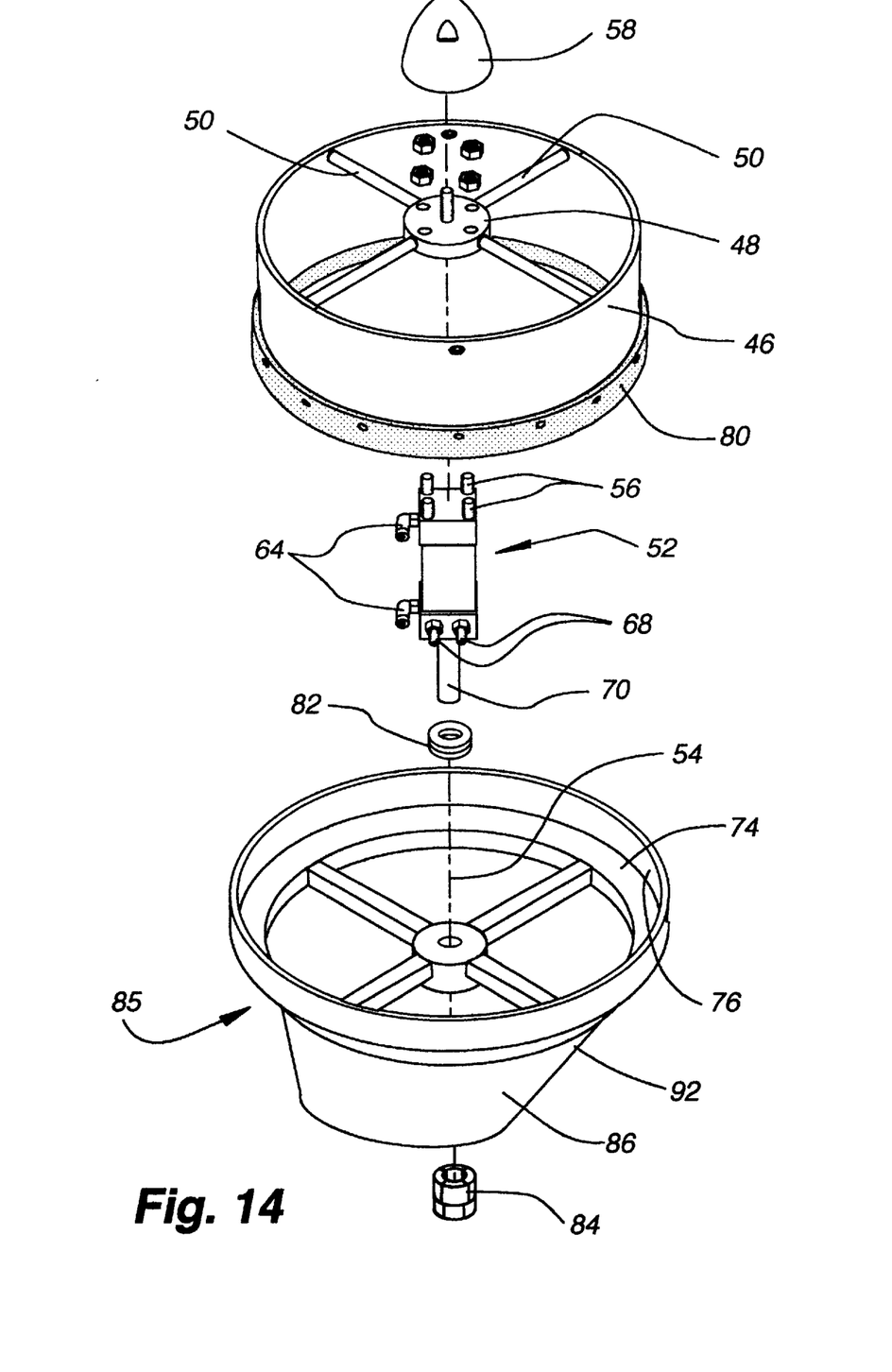
FIG. 14 is an exploded isometric of the shroud and nozzle components that are attached to the fan housing.

The outlet 44 from the fan housing is circular in horizontal cross-section and a first shroud 46 (FIGS. 3–5 and 14) is secured thereto in any suitable manner so as to form a fixed cylindrical downward projection or extension from the fan housing 38. At the top of the shroud 46 is a spoked hub 48 (FIG. 14) providing openings between a plurality of spokes 50 through which air can be blown from the fan housing. With specific reference to FIGS. 3–6, it will be seen that a conventional rotary actuator 52 is mounted on the hub 48 along a central vertical axis 54 of the discharge opening from the fan housing with the actuator being supported from the hub with bolt-type fasteners 56 or the like. A removable crown 58 is positioned over the actuator and secured to the top of the actuator with a threaded shaft 60 (FIG. 6). The crown is generally conical in configuration so as not to unnecessarily impede the flow of air from the fan housing.

The rotary actuator 52 is of a conventional type and is reversible. An example of a actuator found suitable for use in the blow dryer of the present invention is manufactured by Turn-Act of Jeffersontown, Ky. under Model No. CAB4050A. In the disclosed embodiment, the actuator is a pneumatic actuator and as can best be seen in FIG. 4, a pair of pressure conduits 62 are connected to opposite ends of the actuator through which compressed air can be admitted to the actuator at one end or the other depending upon the direction of rotation desired. Each compressed air conduit is connected to the housing of the actuator through an L-shaped connector 64 seen in FIG. 7 which has a reduced aperture plate 66 therein to reduce the flow of air being delivered to the actuator so the rotational speed of the shaft can be controlled and more particularly can be slowed down from its normal or capable speed for purposes that will become apparent hereafter. The actuator also includes a pair of adjustment screws or motion stops 68 on either side of an output shaft 70 such that adjustment of the screws effects the amount of rotary or pivotal movement allowed in either direction of rotation within a 180° arc. In other words, the stops 68 are adapted to effect movement of the drive shaft, internally of the actuator housing, in a well-known manner to limit the pivotal movement of the shaft so the limits of movement of the shaft can be controlled and as will be appreciated later will determine the angle at which air from the blower is directed onto an underlying vehicle.

The output shaft 70 from the actuator is connected to a hub 72 of a second spoked wheel 74 (FIGS. 3–6) with the perimeter of the wheel 74 being secured to a second shroud 76 of circular cross section. The second shroud is displaced further from the fan housing 38 than the first shroud 46 and overlaps the first shroud along its perimeter thereby defining a space 78 therebetween which is sealed by a circular felt seal 80 to prevent the loss of air between the two shrouds. The shrouds in the preferred embodiment are approximately ten and one-half inches in diameter.

As will be appreciated, the second or lower shroud 76 is rotatable relative to the first shroud 46 and its movement is controlled by the rotary actuator 52 whose drive shaft is secured to the hub 72 of the spoked wheel 74 by a thrust washer 82 and a shaft coupler 84 positioned on the drive shaft on opposite sides of the hub. The spoked wheel 74, therefore, moves in unison with the drive shaft.

The lower shroud 76 supports a hollow nozzle 85 having a housing 86 having an eccentric configuration. It is circular at its top where it is connected to the shroud but defines a relatively small discharge opening 88 by way of example (approximately 7 inches in diameter) whose axis of generation 90 forms an angle with the output shaft 70 of the actuator. The nozzle housing has a tapered side wall 92 to further compress the air received from the outlet of the fan housing 38 but the nozzle emits a generally conical concentrated stream of air that is directed toward a vehicle positioned therebeneath. In the preferred embodiment, the compressed conical stream of air impinges a vehicle surface approximately four feet away in a circle approximately one to two feet in diameter even though the air upon impingement with the vehicle immediately disperses across the surface of the vehicle in its general line of direction. Of course, the output shaft 70 of the actuator is also the axis of rotation of the nozzle 85 and as will be appreciated possibly best by reference to FIG. 5, air is discharged through the nozzle at an angle corresponding to the angle at which the discharge opening is oriented relative to the pivotal axis of the nozzle, which corresponds with the axis of the output shaft. While the angle of the stream of discharged air emanating from the blower remains constant relative to the axis of rotation of the nozzle, its circumferential orientation or direction can be regulated with the rotary actuator which rotates the nozzle housing 86 as desired.

As will be appreciated by those skilled in the art, the operation of the rotary actuator 52 and thus the orientation of the discharge opening 88 from the nozzle can all be programmed into the control system for an automatic car wash and as will be appreciated with the description that follows, the positioning of the nozzles is critical to the method of the present invention for efficiently and effectively drying a vehicle that has been previously washed.

Figure 8:
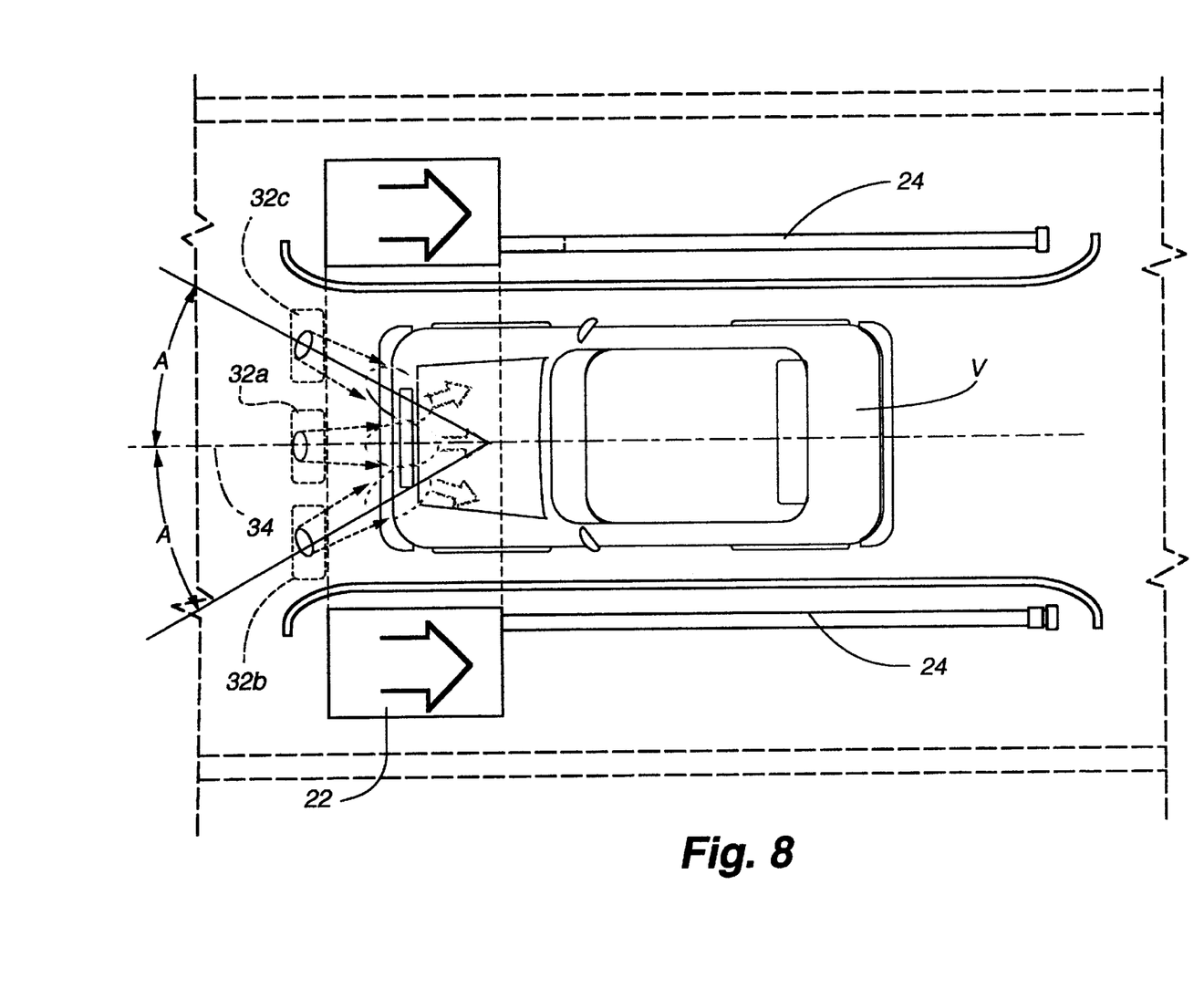
FIG. 8 is a diagrammatic operational plan view showing the apparatus of FIG. 1 positioned at the front of the vehicle being washed.
Figure 9:
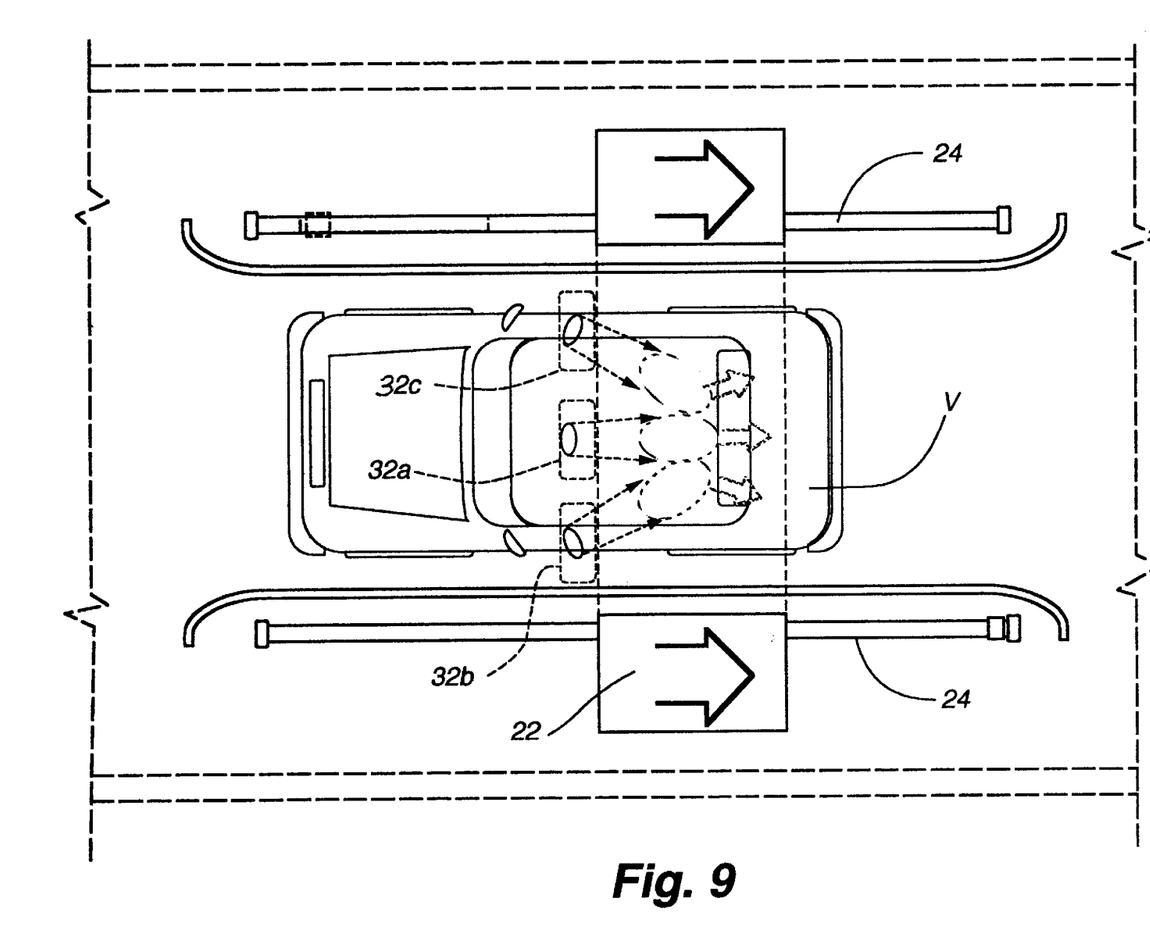
FIG. 9 is a diagrammatic plan view similar to FIG. 8 with the apparatus having been moved toward the rear end of the vehicle.
Figure 10:
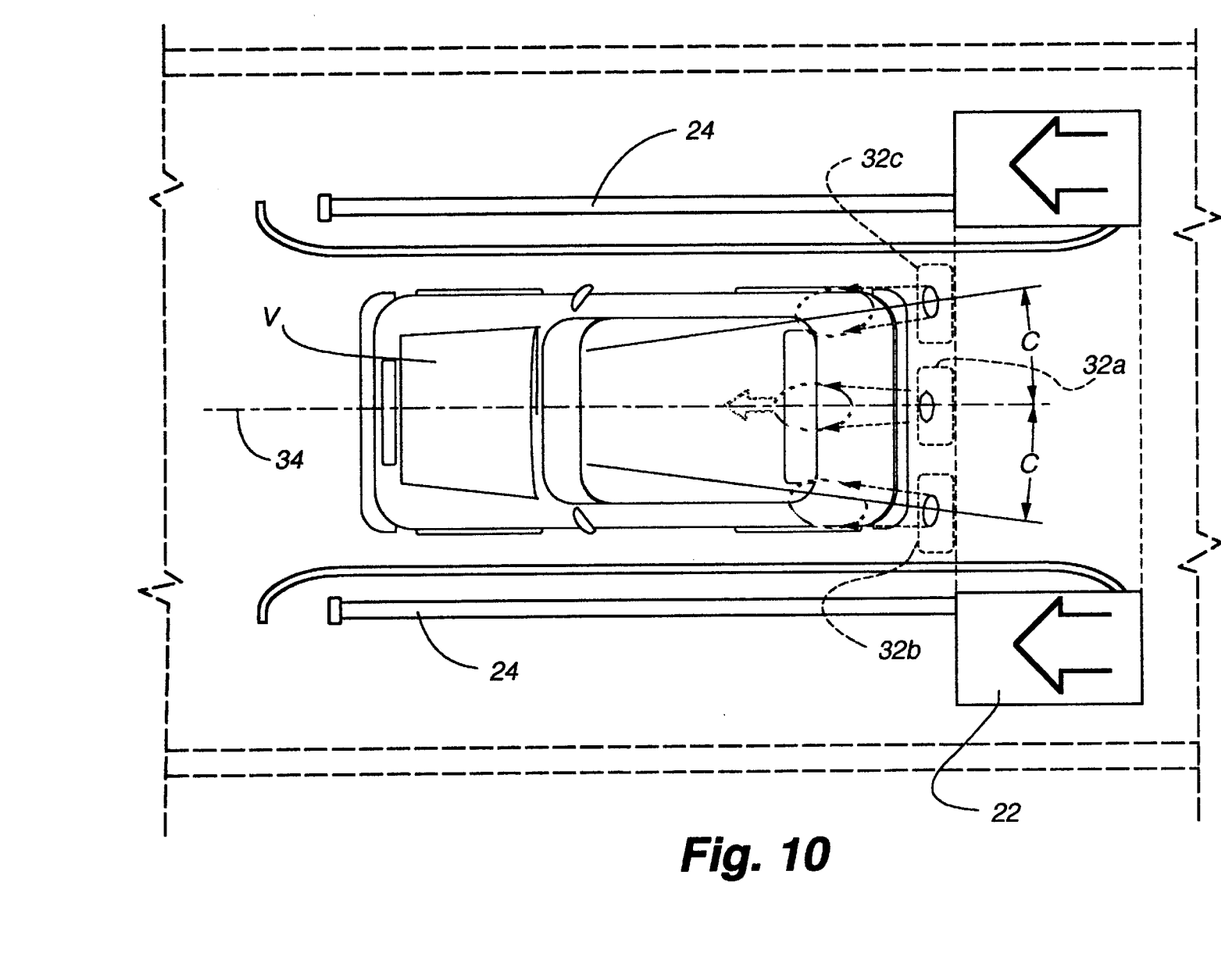
FIG. 10 is a diagrammatic plan view similar to FIGS. 8 and 9 with the apparatus being at the rear end of the vehicle and with the nozzles for the blowers having been reversed in direction.

A first method of the present invention utilizing blowers or air dryers 32 of the type previously described is illustrated in FIGS. 8–10. As will be appreciated, and as seen in FIG. 1, there are three blowers mounted on the frame and as previously described, one of the blowers 32a is in vertical alignment with the longitudinal centerline 34 of the vehicle, a second blower 32b is positioned in vertical alignment with one side of the vehicle, and a third blower 32c in vertical alignment with the opposite side of the vehicle. In FIG. 8, the gantry frame 22 can be seen positioned adjacent the front of the vehicle V and the nozzles 85 are appropriately positioned for optimal drying of the vehicle. It will there be seen that the center nozzle is oriented to form a substantially 0° angle with the longitudinal centerline of the vehicle so that a conical stream of concentrated air is directed along the centerline of the vehicle. It should be appreciated that the nozzles of each of the blowers is generally directed toward the rear of the vehicle so that air, for example, emanating from the center blower 32a is directed downwardly and rearwardly along the centerline of the vehicle. The nozzles of the blowers aligned with the sides of the vehicle 32b and 32c are both oriented slightly inwardly (at approximately the same angle) as well as downwardly so as to form an angle A (FIG. 8) with the longitudinal centerline of the vehicle. The angle A of the side nozzles is defined by the angle of the nozzle with the centerline of the vehicle and is preferably in the range of 10° to 90° with an optimal angle being felt to be approximately 35°. An important factor is that the second and third blowers 32b and 32c, respectively, have their nozzles inclined at an angle relative to the longitudinal centerline of the vehicle so as to cooperate with the center blower 32a in moving air across the top of the vehicle in a rearward and usually sideways directions so that liquid on the surface of the vehicle is simultaneously moved toward the rear end of the vehicle and toward each side. It will also be appreciated that the nozzles are angled downwardly at an angle so that air from each nozzle normally impinges the vehicle at approximately the same location along its length.

The nozzles remain in this orientation as the gantry is moved toward the rear of the vehicle V as best appreciated in FIG. 9 so liquid particles are continually forced toward the rear and sides of the vehicle during a rearward pass of the gantry. Once the gantry reaches the rear end of the vehicle, as shown in FIG. 10, the nozzles are rotated by the associated rotary actuators so the center blower nozzle is directed downwardly and toward the front of the vehicle but again at a 0° angle relative to the longitudinal centerline of the vehicle while the two side blowers are again angled inwardly and downwardly, this time at an angle C (FIG. 10) relative to the longitudinal centerline. The angle C is preferably less than angle A so that more of the concentrated air from the side blowers 32b and 32c impinges the sides of the vehicle to remove liquid on the sides of the vehicle that was directed there during the rearward pass of the gantry. Any remaining moisture on the vehicle after the first pass of the gantry is thereby blown forwardly and off the sides of the vehicle. While the angle C is desirably in the range of 0° to 35°, a preferred angle is 10° relative to the longitudinal centerline of the vehicle.

Once the gantry has reached the front of the vehicle, the nozzles can again be rotated to their position of FIG. 8 for drying a subsequent vehicle. It has been found that one pass of the gantry in each direction with the nozzles positioned as described, provides a very efficient drying of the vehicle and superior to that of conventional automotive blow dryers whose air streams are not focused on removing the moisture from the vehicle in a predetermined pattern.

Figure 11:
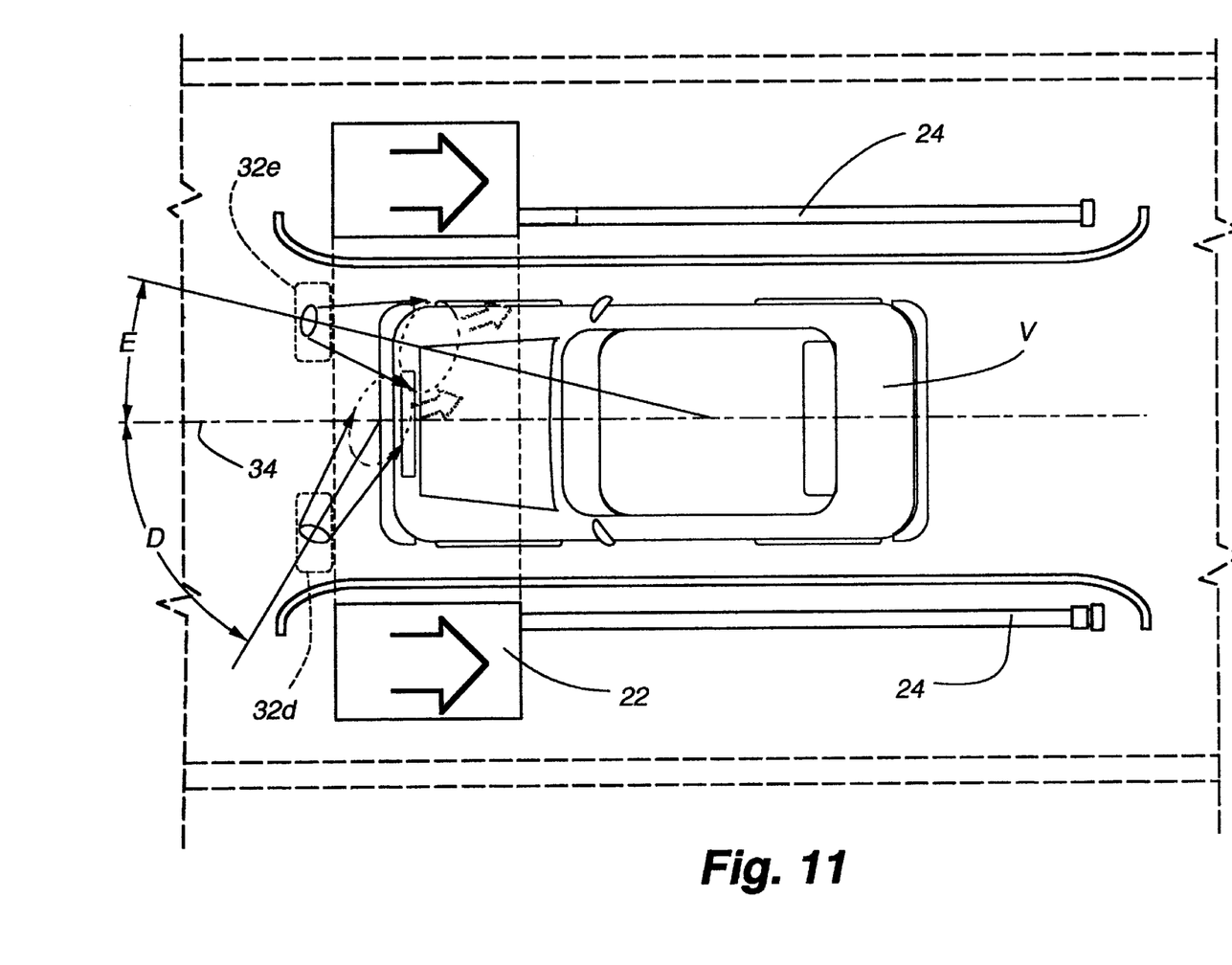
FIG. 11 is a diagrammatic plan view similar to FIG. 8 of a second embodiment of the present invention where only two blowers are utilized and with the apparatus positioned at the front of the vehicle.
Figure 12:
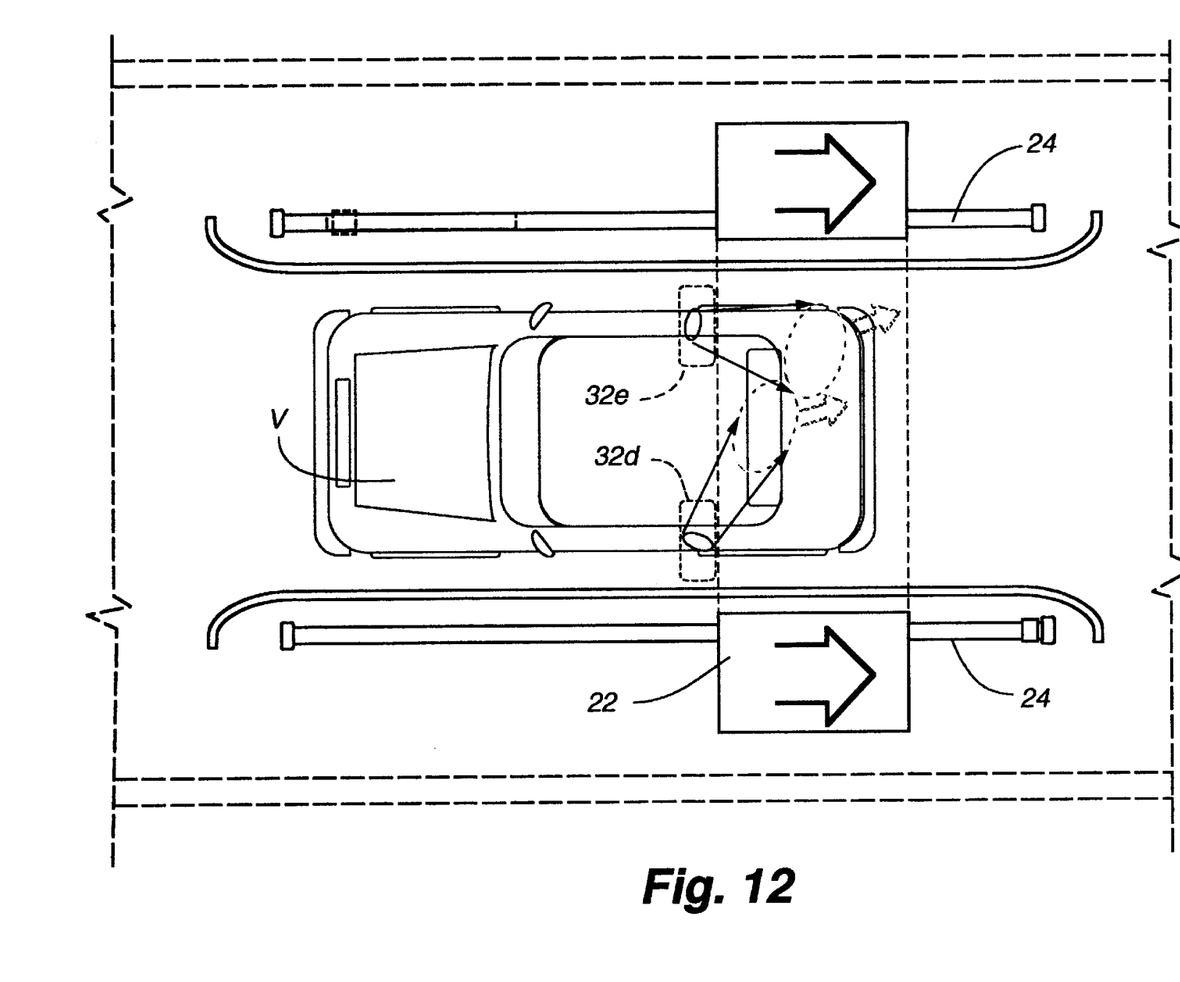
FIG. 12 is a diagrammatic plan view similar to FIG. 11 with the apparatus approaching the rear end of the vehicle.
Figure 13:
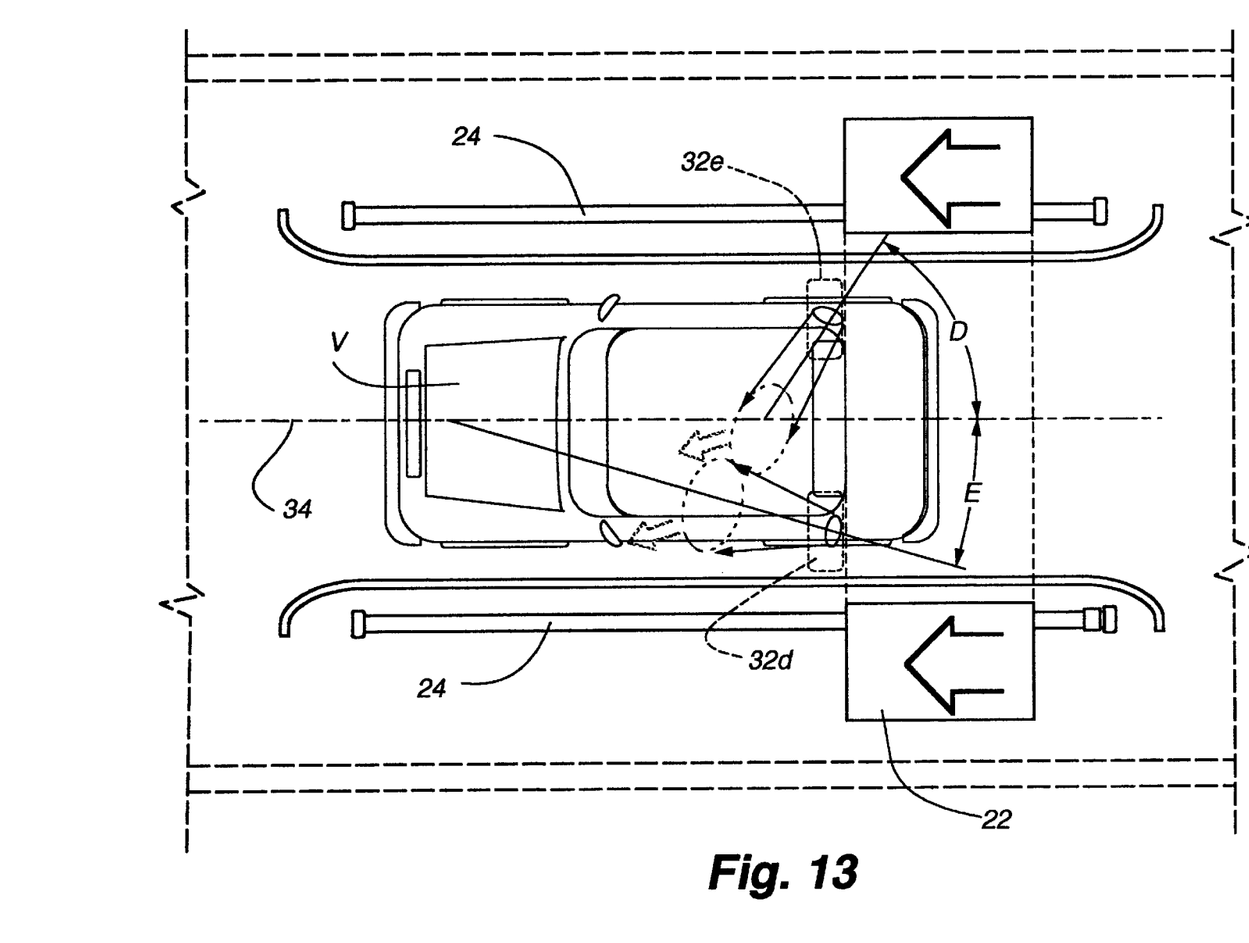
FIG. 13 is a diagrammatic plan view similar to FIGS. 11 and 12 with the apparatus at the rear end of the vehicle and with the blowers having been reversed in direction.

FIGS. 11–13 illustrate a second method of the present invention and in this method, only two blowers 32d and 32e are positioned on the gantry rather than the three illustrated, for example, in FIG. 1. The blowers would be identical to those utilized in the apparatus of FIG. 1 from an operational standpoint but their positioning relative to the vehicle and the angle of the nozzles 85 relative to the vehicle is different as will be described hereafter.

With reference to FIG. 11, it will be seen the gantry is positioned adjacent the front of the vehicle and one blow dryer 32d is positioned in substantial vertical alignment with the left side of the vehicle while the other blow dryer 32e is positioned in substantial vertical alignment with the right side of the vehicle. Nozzle 32d discharges its stream of compressed air at an angle D relative to the longitudinal centerline of the vehicle while nozzle 32e is oriented to discharge its stream of air at an angle E relative to the longitudinal centerline of the vehicle. While angles D and E could be any selected angle between 0° and 90° for optimal removal of liquid particles, it has been found desirable to keep angle D greater than angle E. Again, the nozzles are aligned so as to cooperate in moving liquid particles toward one side and one end of the vehicle so the particles are readily removed from the surface of the vehicle.

The angle D could be any desired angle, but it has been found to desirably be in the range of 30° to 90° with a preferred angle being approximately 80° while angle E again could be any desired angle, but has been found to desirably be in the range of 0° to 35° with the preferred angle being 10°.

In a drying operation, the nozzles are first oriented as shown in FIG. 11 at the front of the vehicle and the gantry is moved toward the rear of the vehicle so that liquid particles on the vehicle are blown rearwardly and to the right side of the vehicle where they are encouraged to be removed from the lower edge of the right side of the vehicle or from the rear of the vehicle. As will be appreciated by reference to FIG. 12, as the gantry approaches the rear of the vehicle, the air is continuing to encourage liquid particles to be removed from the right side and the rear of the vehicle.

When the gantry reaches the rear end of the vehicle, the nozzles are pivoted to be generally directed toward the front of the vehicle and so the nozzle of the blower 32e on the right side of the vehicle assumes the angle D and the nozzle of the blower 32d on the left side of the vehicle assumes the angle E. As the gantry then moves toward the front of the vehicle, it will be seen that any moisture remaining on the vehicle is moved toward the left side and front of the vehicle so that any moisture on the vehicle is always being moved toward an edge of the vehicle.

The relatively small angle E is utilized so that a significant portion of the cylindrical air stream emanating from the nozzle oriented at angle E impinges the side of the vehicle to effectively force liquid particles downwardly across the side of the vehicle and off the bottom side edges of the vehicle.

It will be appreciated from the above that a blow dryer and method of using the same have been described which provide a new and improved system for effectively drying a vehicle which has previously been washed, for example, in an automated car wash system. The method of using the blow dryer is such that the concentrated streams of air emanating from the blowers complement each other and are always moving liquid particles on the vehicle toward an edge of the vehicle where they will drop from the lower side and end edges of the vehicle.

Although the present invention has been described with a certain degree of particularity, it is understood that the present disclosure has been made by way of example, and changes in detail or structure may be made without departing from the spirit of the invention as defined in the appended claims.

What is claimed is:

1. A dryer for an automotive car wash comprising in combination:
    a fan having an air intake and an air outlet,
    a nozzle pivotally mounted to said fan at said outlet to receive air from said fan and re-direct the air in a concentrated stream, said nozzle being pivotal about a fixed axis, and
    a rotary actuator having a drive shaft coaxial with said fixed axis for selectively pivoting said nozzle about said fixed axis.

2. The dryer of claim 1 wherein said nozzle has an outlet for directing said concentrated stream of air along an axis and wherein said air stream axis forms an angle with said fixed axis.

3. The dryer of claim 2 wherein said air stream axis pivots along an imaginary conical surface about said fixed axis when said nozzle is pivoted about said fixed axis.

4. The dryer of claim 1 further including means for limiting the rotary movement of said drive shaft whereby said nozzle can be reversibly pivoted about said fixed axis within a 180° arc.

5. A method of drying the exterior surface of a vehicle comprising the steps of:
    providing a vehicle to be dried, said vehicle being elongated with a front end and a rear end and a top surface and side surfaces extending adjacent to said top surfaces from said front cud to said rear end,
    providing three blowers with nozzles mounted above said vehicle in a position to in aggregate blow air onto the top and sides of said vehicle, one of said blowers being approximately aligned with one side of said vehicle, another approximately aligned with the other side of said vehicle and the third approximately aligned with a longitudinal centerline of said vehicle extending from the front to the rear of said vehicle, said blowers being mounted for relative reciprocal linear movement along the length of said vehicle, and each nozzle being pivotally mounted to direct a concentrated stream of air downwardly onto said vehicle along the length thereof and at a selected angle to said longitudinal centerline,
    positioning said blowers at one end of said vehicle,
    selecting a first angle in the range of 10° to 90° for said one and said another nozzles and a substantially 0° angle for said third nozzle relative to said longitudinal centerline with the nozzles being generally directed toward the opposite end of said vehicle,
    establishing relative linear movement between said blowers and said vehicle until said blowers reach the opposite end of said vehicle,
    adjusting said angles of said nozzles to face generally toward said one end of said vehicle with said one and said another nozzles forming an angle in the range of 10° to 90° with respect to said longitudinal centerline and said third nozzle forming a substantially 0° angle with said longitudinal centerline, and
    establishing relative linear movement between said blowers and said vehicle until said blowers reach said one end of said vehicle.

6. The method of claim 5 wherein the angle of said one and said another nozzles is approximately 35°.

7. A method of drying the exterior surface of a vehicle comprising the steps of:
    providing a vehicle to be dried, said vehicle being elongated with a front end and a rear end and a top surface and side surfaces extending adjacent to said top surfaces from said front end to said rear end,
    providing three blowers with nozzles mounted above said vehicle in a position to in aggregate blow air onto the top and sides of said vehicle, one of said blowers being approximately aligned with one side of said vehicle, another approximately aligned with the other side of said vehicle and the third approximately aligned with a longitudinal centerline of said vehicle extending from the front to the rear of said vehicle, said blowers being mounted for relative reciprocal linear movement along the length of said vehicle, and each nozzle being pivotally mounted to direct a concentrated stream of air downwardly onto said vehicle along the length thereof and at a selected angle to said longitudinal centerline,
    positioning said blowers at one end of said vehicle,
    selecting a 90° angle for said one and said another nozzles and a substantially 0° angle for said third nozzle relative to said longitudinal centerline with the third nozzle being directed toward the opposite end of said vehicle,
    establishing relative linear movement between said blowers and said vehicle until said blowers reach the opposite end of said vehicle,
    adjusting said angle of said third nozzle to face toward said one end of said vehicle with said one and said another nozzles remaining at 90° angles with respect to said longitudinal centerline and said third nozzle forming a substantially 0° angle with said longitudinal centerline, and
    establishing relative linear movement between said blowers and said vehicle until said blowers reach said one end of said vehicle.

* * * * *